C. L. WEIL.
MEANS FOR PROVIDING CATTLE WITH SALT.
APPLICATION FILED MAY 13, 1911.
1,009,361.
Patented Nov. 21, 1911.
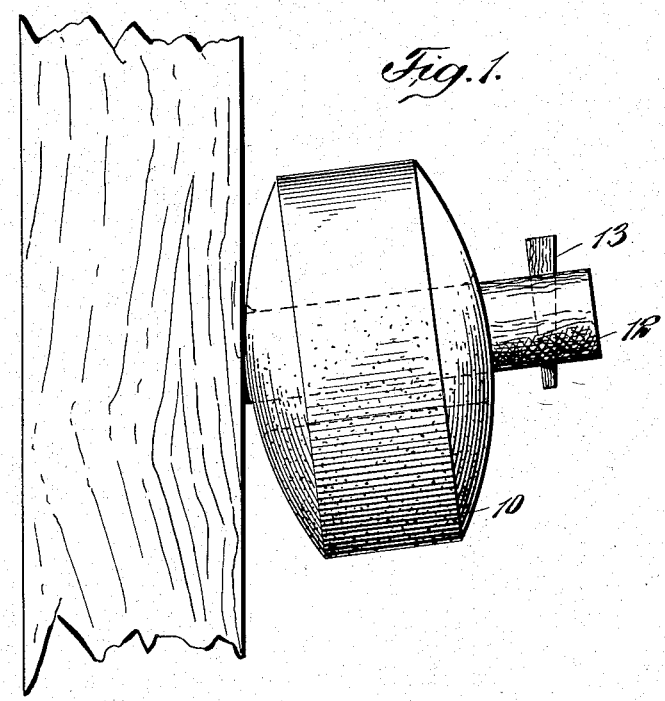
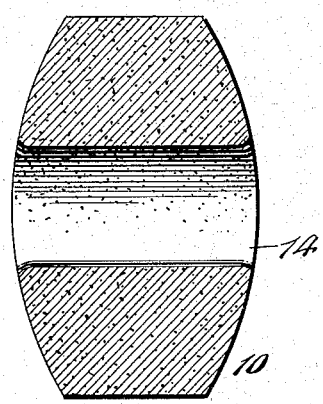
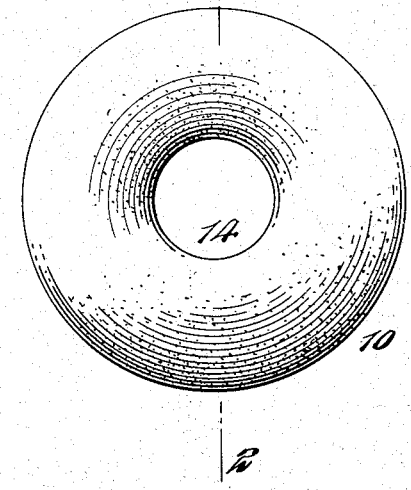
WITNESSES
INVENTOR
Charles L. Weil
BY
ATTORNEY

UNITED STATES PATENT OFFICE.

CHARLES L. WEIL, OF ST. CLAIR, MICHIGAN, ASSIGNOR TO DIAMOND CRYSTAL SALT COMPANY, OF ST. CLAIR, MICHIGAN, A CORPORATION OF MICHIGAN.

MEANS FOR PROVIDING CATTLE WITH SALT.

1,009,361.  Specification of Letters Patent.  Patented Nov. 21, 1911.

Application filed May 13, 1911. Serial No. 626,940.

*To all whom it may concern:*

Be it known that I, CHARLES L. WEIL, a citizen of the United States, residing at St. Clair, in the county of St. Clair and State of Michigan, have invented certain new and useful Improvements in Means for Providing Cattle with Salt, of which the following is a specification.

The invention relates to improved means for providing cattle with the salt they require, and its object is to dispense entirely with the customary method of supplying salt to cattle involving the use of iron receptacles in which lumps of rock-salt are placed and to provide in lieu thereof a specially shaped and prepared briquet of salt which may be hung upon a wooden peg and rotate thereon as the salt is licked by the cattle.

One purpose of the invention is to provide cattle with an improved quality or condition of salt and to do so in a manner which will insure cleanliness and eliminate the objections to the employment of iron or other receptacles for holding the salt.

In the accompanying drawings forming a part of this application, Figure 1 is a side elevation of a briquet and a suitable support therefor, the latter being partly broken away, embodying my invention, Fig. 2 a detached vertical section through the briquet on the dotted line 2—2 of Fig. 3, and Fig. 3 a side elevation of the briquet.

In the drawings, 10 designates the briquet, 11 a portion of a post or other support, and 12 a wooden peg secured to said post and preferably inclined upwardly and outwardly therefrom and upon which the briquet is hung and there retained by a key, or the like, 13. The peg 12 may be driven into a socket in the post 11, or otherwise secured thereto as may be convenient.

The briquet 10 is a manufactured article and consists of salt pressed into a solid cake or tablet and preferably in the particular form illustrated in the drawings. The briquet in the form shown has a suitably broad periphery, convex side-faces and a central transverse opening or hole 14 which enables the briquet to be hung upon the peg 12 and also to rotate thereon when the salt is being licked by cattle. The briquet 10 being formed of salt under pressure is solid and not at all likely to unduly dissolve or disintegrate or be broken during handling or shipment. The form of the briquet shown is desirable for the purposes of the cattle and also because when in said form the briquet may be readily manufactured and shipped in burlap bags, or the like, without danger of the briquets being fractured or subjected to other injury which would result in waste.

One purpose of the invention is to provide a briquet 10 which may be readily manufactured, handled and shipped and at the same time adapted to be hung upon a peg 12 with the surfaces of the briquet largely exposed and kept from contact with surfaces which might act to the injury of the salt or the cattle licking the same.

It is a desirable result of my invention that its use avoids the metal receptacles with the consequent rust and contamination of the salt, which have heretofore been employed in supplying cattle with salt.

The peg 12 and briquet 10 may be located in the stable, in which event the post 11 will represent a part of the frame-work of the stalls, or applied to any suitable post or tree in the pasture.

What I claim as my invention and desire to secure by Letters-Patent, is:—

As a new article of manufacture a briquet of compressed salt for the use of cattle, said briquet having a circular periphery, convex side-faces and a transverse hole adapting the article to be freely hung upon a peg, or the like.

Signed at St. Clair, in the county of St. Clair and State of Michigan, this 2nd day of May, 1911.

CHAS. L. WEIL.

Witnesses:
 FRANK MOORE, Jr.,
 BENJ. R. WHIPPLE.